Feb. 9, 1960 — L. FILBERICH — 2,924,749
CONTROL CIRCUITRY
Filed Nov. 21, 1957 — 2 Sheets-Sheet 1

WITNESSES:

INVENTOR
Ludwig Filberich

ATTORNEY

Feb. 9, 1960 L. FILBERICH 2,924,749
CONTROL CIRCUITRY
Filed Nov. 21, 1957 2 Sheets-Sheet 2

United States Patent Office 2,924,749
Patented Feb. 9, 1960

2,924,749

CONTROL CIRCUITRY

Ludwig Filberich, Berlin-Siemensstadt, Germany, assignor to Siemens-Schuckertwerke Aktiengesellschaft, Erlangen, Germany, a corporation of Germany Application November 21, 1957, Serial No. 697,954

Claims priority, application Germany November 23, 1956

6 Claims. (Cl. 315—146)

The invention relates to a circuitry for the grid control of electric discharge vessels by means of an abruptly increasing voltage.

It is an object of this invention to provide improved control circuitry for electric discharge vessels.

It is another object of this invention to provide improved control circuitry for the grid control of electric discharge vessels by means of apparatus providing an abruptly increasing voltage.

Further objects of this invention will become apparent from the following description when taken in conjunction with the accompanying drawings. In said drawings, for illustrative purposes only, are shown preferred forms of the invention.

Figure 1:
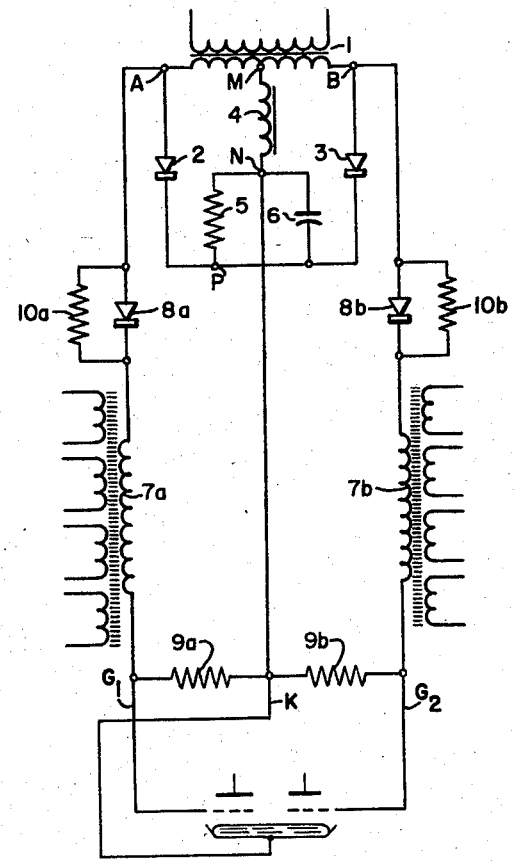
Figure 1 is a schematic diagram of an embodiment of the teachings of this invention illustrating control circuitry for electric discharge vessels.

For the control of each grid of a grid controlled converter there is provided a separate series connection comprising a saturable reactor having a controllable premagnetization and a saturation-angle control, that is, a reactor in series with a rectifier valve, and a resistor from which the control voltage for the grid of the converter is taken, said series connection being supplied with a non-sinusoidal voltage from a two-phase rectifier circuit in which a load resistor is connected through a smoothing choke to a center tap of a secondary winding of a supply transformer, the non-sinusoidal voltage being tapped off between one end of the secondary winding of the transformer or the rectifier terminal which is connected to the transformer, respectively, and the conductor interconnecting the load resistor and the smoothing choke.

Such a circuit has the advantageous characteristic that a non-sinusoidal alternating voltage can be directly derived therefrom without an additional source of direct-current voltage, the positive half-wave of said voltage which is trapezoidal and comprises a range of more than 180°, being utilized to produce the grid voltage of the converter, and the negative half-wave of said voltage effecting the resetting of the saturable reactor connected in series with a rectifier and with the grid resistor from which the grid voltage for the converter is taken.

Such circuitry including a two-phase rectifier circuit may be employed to supply only one grid voltage, but may also be used for supplying the voltage of two control grids operating with a phase displacement of 180° on the converter. In this case, a voltage is tapped off in the circuit at each end of the secondary winding of the transformer feeding the two-phase circuit, and at the conductor interconnecting the load resistor and the smoothing choke of the two-phase rectifier circuit.

The application of the invention is not limited to supplying only two control grids of a converter, but may be extended to a converter having any desired number of phases. If a $2n$-phase converter is involved, with $n$ being an integer greater than 1, then, according to the invention, there will be provided one two-phase rectifier circuit each for supplying two control circuits of the converter, said latter circuits being displaced in phase by 180 electric degrees. Of course, this will necessitate for each one of the two-phase rectifier circuits a separate smoothing choke at the center tap of the secondary winding of the supply transformer. Only one common load resistor is required for all two-phase rectifier circuits.

The invention is applicable not only to circuits of converters for even numbers of phases. Thus, a corresponding arrangement may also be used in connection with $(2n-1)$-phase circuits, such as, for example, with a three-phase circuit. In this case, advantageous use may also be made of the possibility that although a separate two-phase rectifier circuit is required for producing each control grid voltage for the converter, the center tap of the secondary winding having connected thereto one smoothing choke each, there, again, can be used one common load resistor for all two-phase circuits, which load resistor, as the case may be, may have a capacitor connected in parallel thereto for the purpose of smoothing and stabilizing the supplied voltage, as described in principle later herein.

Hereinbefore, it has been stated that the non-sinusoidal alternating-current voltage is tapped off between one end of the secondary winding of the supply transformer of the two-phase circuit and the conductor interconnecting the smoothing choke and the load resistor. The height of the positive half-wave of this alternating-current voltage can be controlled if the load resistor therefor is designed to function as a potentiometer. The grid resistor would then be connected to an adjustable tap of said potentiometer-load resistor. For the purpose of improving or smoothing, respectively, the trapezoidal shape of the positive half-wave of the non-sinusoidal voltage supplied by the two-phase circuit, a capacitor is preferably connected in parallel with the load resistor of the two-phase circuit. At the same time, this capacitor will function to stabilize the voltage from the two-phase circuit and, consequently, to stabilize the grid voltage of the converter. For the controllable saturable reactor of the arrangement, comprising a reactor connected in series with a rectifier in series with the grid resistor from which the control grid voltage for the converter is taken, it may be desirable to effect also a resetting of said reactor through an additional resistor connected in parallel with the rectifier, which, in cooperation with the control winding or windings proper, will then determine the respective operating point of the reactor functioning with a saturation-angle control, from which the magnetization of said reactor in "upward" direction will occur.

A circuit to which the invention may be applied is illustrated, by way of example, in Fig. 1 of the accompanying drawings.

Fig. 1 shows a transformer 1 adapted to supply a two-phase rectifier circuit comprising two rectifiers 2 and 3, a smoothing choke 4, and a load resistor 5. Connected in parallel with said load resistor 5 is a capacitor 6. From this two-phase circuit, the non-sinusoidal voltage applied to the grid resistor $9a$ through the saturable reactor $7a$ in series with rectifier $8a$ is tapped off between the terminal A of the secondary winding of the transformer 1 and point N located between the smoothing choke and the load resistor 5. Connected in parallel with rectifier $8a$ is an ohmic resistor $10a$. The voltage for a control grid of the converter is taken from the grid resistor $9a$, line K being connected, as the case may be, through a source of negative bias voltage to the cathode of the converter, and line $G_1$ being connected to one of the control grids of said converter. Between point N and the other terminal B of the secondary winding of the transformer 1 there is tapped off the non-sinusoidal voltage for another control grid of the converter through a saturable reactor $7b$ in series with a rectifier $8b$ having connected in parallel therewith an ohmic resistance $10b$. The voltage for the second grid $G_2$ of the converter is tapped off at resistor $9b$ in the same manner as explained above in connection with grid $G_1$.

The mode of operation of this arrangement will now be described with reference to Fig. 2.

Figure 2:
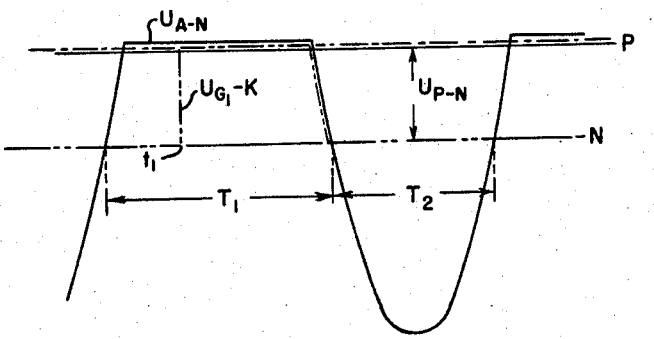
Fig. 2 is a graphical representation of electrical waveforms present at selected points of the apparatus illustrated in Fig. 1.

In Fig. 2, the dash-dot parallel, with the distance $U_{P-N}$ relative to the straight line representing the potential of point N in the circuit of Fig. 2 indicates the height of the practically smooth direct voltage $U_{P-N}$ appearing in the circuit between points P and N, i.e. across the load resistor 5 of the two-phase rectifier circuit. The curve shown in full lines represents the voltage $U_{A-N}$ obtained between points A and N of the circuit of Fig. 1, that is, of the series connection including the rectifier valve 2 and the load resistor 5 of the two-phase circuit. This feeds the circuit comprising the rectifier arrangement $7a$—$8a$ and the grid resistor $9a$ from which the grid voltage $G_1$-K for the converter is taken.

If rectifier 2 becomes conductive in a forward direction when terminal A of the secondary winding of the transformer 1 has a positive potential thereon, there will be only a small residual voltage across rectifier 2, corresponding to the elevation of curve $U_{A-N}$ shown in full lines, over the curve or straight line $U_{P-N}$, whereas rectifier 3 will have the full cut-off voltage practically of the value $U_{A-B}$. At the following half-wave of the alternating current fed to the transformer 1, when terminal B of the secondary winding of said transformer has a positive potential, the rectifier 3 will open in forward direction so that it will have only a small reset voltage thereacross, the full cutoff voltage, practically of the value $U_{A-B}$, appearing at valve 2. Thus, the voltage tapped off between points A and N and fed to the circuit through the grid resistor $9a$ is made up from time to time of the "superposition" of the voltages across valve 2 with the direct-current voltage $U_{P-N}$ between points P and N or across the load resistor 5 of the two-phase rectifier circuit, respectively. Said voltage $U_{A-N}$ is a pure alternating voltage, and it consists of a trapezoidal positive half-wave having a width of more than 180 electric degrees within the shown interval $T_1$, and of a sinusoidal negative half-wave in the time interval $T_2$. From the positive trapezoidal portion of said voltage $U_{A-N}$, the desired grid voltage is obtained in the circuit through the rectifier-reactor arrangement $7a$, $8a$, $10a$ and the grid resistor $9a$. By changing the control magnetization of reactor $7a$ it is possible to displace the steep front of the initial grid voltage $U_{G1-K}$, which sets in at $t_1$ as indicated in Fig. 2 by a dash-double-dot chain line, within a range of more than 180 electric degrees. In Fig. 1 the saturable reactor is shown to have a plurality of control windings by means of which various magnetic control effects can be superposed with respect to each other.

The control voltage for grid $G_2$ of the converter, which operates with a phase position displaced 180 electric degrees relative to grid $G_1$, analogously is produced at the grid resistance $9b$ of the arrangement, said resistance receiving the non-sinusoidal alternating current voltage from between points B and N of the circuit through the reactor $7b$ and valve $8b$ having associated therewith the shunt resistance $10b$.

Figure 3:
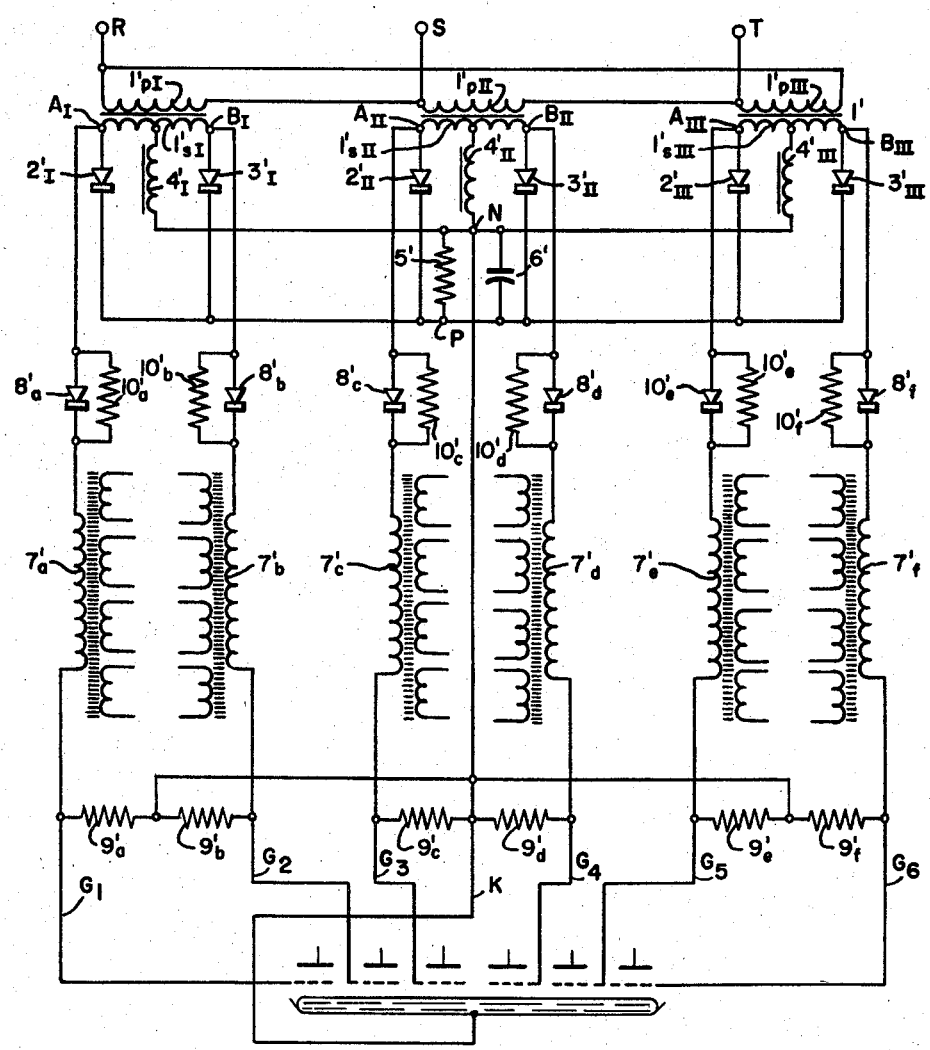
Fig. 3 is a schematic diagram of a second embodiment of the teachings of this invention.

Fig. 3 shows an embodiment of the invention as applied to a $2n$-phase-supplied converter, namely to a 6-phase-supplied converter. The transformer $1'$ has delta-connected primary windings $1'_{pI}$ to $1'_{pIII}$ having secondary windings $1'_{sI}$ to $1'_{sIII}$ associated therewith. Each of these secondary windings supplies a two-phase rectifier circuit, and each of these rectifier circuits includes a pair of rectifiers $2'_I$ and $3'_I$, $2'_{II}$ and $3'_{II}$, $2'_{III}$ and $3'_{III}$, respectively, as well as smoothing chokes $4'_I$, $4'_{II}$ and $4'_{III}$, respectively. All of the two-phase rectifier circuits have in common the load resistor $5'$ with the shunting capacitor $6'$. The non-sinusoidal voltage for supplying the circuits of the grid resistances $9'_a$ to $9'_f$ from which the grid voltages for the control grids $G_1$ to $G_6$ are taken is tapped off between point N of the circuit and one of the terminals $A_I$, $B_I$, $A_{II}$, $B_{II}$, $A_{III}$ and $B_{III}$ of the secondary windings of the transformer $1'$.

If there is involved only a $(2n-1)$-phase-supplied converter when the suitable circuit would be obtained by omitting the grid resistances $9b$, $9d$ and $9f$ as well as the reactors and rectifier through which said resistances are supplied from the two-phase circuits. Also in this case, all of the two-phase rectifier circuits will require only one common load resistor, such as $5'$, having a bypass capacitor $6'$ as the case may be, associated therewith.

In conclusion, it is pointed out that while the illustrated examples constitute practical embodiments of the invention, it is not intended to limit to the exact details shown, since modifications of the same may be varied without departing from the spirit of this invention.

I claim as my invention:

1. In control circuitry, in combination; means for connecting said control circuitry to a control grid of an electric discharge vessel; means from which a control voltage for said grid may be taken and saturable reactor means having controllable saturation-angle and premagnetization connected in series circuit relationship; and a two phase rectifier circuit for supplying a non-sinusoidal voltage to said serially connected control voltage means and saturable reactor means; said two phase rectifier circuit comprising a load resistor connected in series with a smoothing choke to a center tap of a secondary winding of a supply transformer; said non-sinusoidal voltage being tapped off between one terminal of said secondary winding of said transformer and the junction of said load resistor and smoothing choke.

2. In control circuitry, in combination; means for connecting said control circuitry to a control grid of an electric discharge vessel; means from which a control voltage for said grid may be taken and saturable reactor means having controllable saturation-angle and premagnetization connected in series circuit relationship; and a two phase rectifier circuit for supplying a non-sinusoidal voltage to said serially connected control voltage means and saturable reactor means; said two phase rectifier circuit comprising a load resistor connected in series with a smoothing choke to a center tap of a secondary winding of a supply transformer; said non-sinusoidal voltage being tapped off between one terminal of said secondary winding of said transformer and the junction of said load resistor and smoothing choke; said means from which a control voltage for said grid may be taken being connected to said junction of said load resistor and said smoothing choke.

3. In control circuitry, in combination; means for connecting said control circuitry to a control grid of an electric discharge vessel; means from which a control voltage for said grid may be taken and saturable reactor means having controllable saturation-angle and premagnetization connected in series circuit relationship; and a two phase rectifier circuit for supplying a non-sinusoidal voltage to said serially connected control voltage means and saturable reactor means; said two phase rectifier circuit comprising a load resistor connected in series with a smoothing choke to a center tap of a secondary winding of a supply transformer; said non-sinusoidal voltage being tapped off between one terminal of said secondary winding of said transformer and the junction of said load resistor and smoothing choke; said load resistor being designed to function as a potentiometer; said means from which a control voltage for said grid may be taken being connected to an adjustable tap of said potentiometer load resistor.

4. In control circuitry, in combination; means for connecting said control circuitry to a control grid of an electric discharge vessel; means from which a control voltage for said grid may be taken and saturable reactor means having controllable saturation-angle and premagnetization connected in series circuit relationship; and a two phase rectifier circuit for supplying a non-sinusoidal voltage to said serially connected control voltage means and saturable reactor means; said two phase rectifier circuit comprising a load resistor connected in series with a smoothing choke to a center tap of a secondary winding of a supply transformer; said non-sinusoidal voltage being tapped off between one terminal of said secondary winding of said transformer and the junction of said load resistor and smoothing choke; said load resistor being designed to function as a potentiometer; said means from which a control voltage for said grid may be taken being connected to an adjustable tap of said potentiometer load resistor; said load resistor having capacitive means connected in parallel therewith whereby said non-sinusoidal voltage is smoothed and stabilized.

5. In control circuitry, in combination; means for connecting said control circuitry to a control grid of an electric discharge vessel; means from which a control voltage for said grid may be taken, rectifying means, and saturable reactor means, having controllable saturation-angle and premagnetization, connected in series circuit relationship; and a two phase rectifier circuit for supplying a non-sinusoidal voltage to said serially connected control voltage means and saturable reactor means; said two phase rectifier circuit comprising a load resistor connected in series with a smoothing choke to a center tap of a secondary winding of a supply transformer; said non-sinusoidal voltage being tapped off between one terminal of said secondary winding of said transformer and the junction of said load resistor and smoothing choke; said load resistor being designed to function as a potentiometer; said means from which a control voltage for said grid may be taken being connected to an adjustable tap of said potentiometer load resistor; said load resistor having capacitive means connected in parallel therewith whereby said non-sinusoidal voltage is smoothed and stabilized.

6. In control circuitry, in combination; means for connecting said control circuitry to a control grid of an electric discharge vessel; means from which a control voltage for said grid may be taken, rectifying means having connected in parallel therewith a shunt resistor means to provide a resetting current, and saturable reactor means, having controllable saturation-angle and premagnetization, connected in series circuit relationship; and a two phase rectifier circuit for supplying a non-sinusoidal voltage to said serially connected control voltage means and saturable reactor means; said two phase rectifier circuit comprising a load resistor connected in series with a smoothing choke to a center tap of a secondary winding of a supply transformer; said non-sinusoidal voltage being tapped off between one terminal of said secondary winding of said transformer and the junction of said load resistor and smoothing choke; said load resistor being designed to function as a potentiometer; said means from which a control voltage for said grid may be taken being connected to an adjustable tap of said potentiometer load resistor; said load resistor having capacitive means connected in parallel therewith whereby said non-sinusoidal voltage is smoothed and stabilized.

References Cited in the file of this patent
UNITED STATES PATENTS 2,817,791   Smart et al. _____ Dec. 24, 1957